United States Patent
Murschall et al.

(10) Patent No.: US 6,797,358 B2
(45) Date of Patent: Sep. 28, 2004

(54) UNILATERALLY MAT, SEALABLE, UV-STABILIZED, FLAME RESISTANT, CO-EXTRUDED, BIAXIALLY ORIENTED POLYESTER FILM, METHOD FOR THE PRODUCTION AND THE USE THEREOF

(75) Inventors: Ursula Murschall, Nierstein (DE); Ulrich Kern, Ingelheim (DE); Guenther Crass, Taunusstein (DE); Herbert Peiffer, Mainz (DE); Hans Mahl, Walluf (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/182,294

(22) PCT Filed: Jan. 10, 2001

(86) PCT No.: PCT/EP01/00214

§ 371 (c)(1),
(2), (4) Date: Jul. 26, 2002

(87) PCT Pub. No.: WO01/60613

PCT Pub. Date: Aug. 23, 2001

(65) Prior Publication Data

US 2003/0064195 A1 Apr. 3, 2003

(30) Foreign Application Priority Data

Feb. 19, 2000 (DE) .......................... 100 07 722

(51) Int. Cl.$^7$ ..................... B32B 27/08; B32B 27/18; B32B 27/20; B32B 27/36; B32B 31/30
(52) U.S. Cl. ..................... 428/141; 428/212; 428/347; 428/349; 428/355 R; 428/480; 428/910; 264/288.4; 264/290.2
(58) Field of Search ................. 428/141, 480, 428/910; 264/288.4, 290.2

(56) References Cited

U.S. PATENT DOCUMENTS

| 5,173,357 A | * | 12/1992 | Nakane et al. | ............... 428/220 |
| 5,955,181 A | * | 9/1999 | Peiffer et al. | ............... 428/212 |
| 6,136,420 A | * | 10/2000 | Hibiya et al. | ............... 428/213 |
| 6,358,604 B1 | * | 3/2002 | Peiffer et al. | ............... 428/336 |
| 6,423,401 B2 | * | 7/2002 | Peiffer et al. | ............... 428/216 |
| 2002/0014944 A1 | * | 2/2002 | Dinsmore | ................... 337/157 |
| 2003/0054129 A1 | * | 3/2003 | Murschall et al. | ............ 428/97 |
| 2003/0118817 A1 | * | 6/2003 | Murschall et al. | .......... 428/395 |

FOREIGN PATENT DOCUMENTS

| EP | 0 144 878 A1 | 3/1975 |
| EP | 0 031 202 A2 | 7/1981 |
| EP | 0 031 203 A2 | 7/1981 |
| EP | 0 035 835 A1 | 9/1981 |
| EP | 0 076 582 A1 | 4/1983 |
| EP | 0 432 886 A2 | 6/1991 |
| EP | 0 515 096 A2 | 11/1992 |
| EP | 0 712 719 A2 | 5/1996 |
| EP | 0 903 222 A2 | 3/1999 |
| EP | 0 947 982 A2 | 10/1999 |
| EP | 0 976 548 A2 | * 2/2000 |
| GB | 1 465 973 | 3/1977 |
| GB | 2 344 596 A | 6/2000 |
| WO | WO 98/06575 A1 | 2/1998 |

* cited by examiner

Primary Examiner—Vivian Chen
(74) Attorney, Agent, or Firm—ProPat, L.L.C.

(57) ABSTRACT

The invention concerns a unilaterally mat, sealable, UV-stabilized and flame-resistant, sealable, co-extruded, biaxially oriented polyester film comprising at least one base layer (B) and a sealable top coating (A) applied to both sides of said base layer, in addition to a mat covering (C). The film also contains at least one UV stabilizer as a light stabilizer. The invention further concerns a method for the production of said film and the use thereof.

23 Claims, No Drawings

UNILATERALLY MAT, SEALABLE, UV-STABILIZED, FLAME RESISTANT, CO-EXTRUDED, BIAXIALLY ORIENTED POLYESTER FILM, METHOD FOR THE PRODUCTION AND THE USE THEREOF

The invention relates to a sealable, UV-resistant, co-extruded, biaxially oriented polyester film which has one matt side and is composed of at least one base layer B and of, applied to the two sides of this base layer, a sealable outer layer A and a matt outer layer C. The film also comprises at least one UV stabilizer as light stabilizer. The invention also includes the use of the film and a process for its production.

BACKGROUND OF THE INVENTION

GB-A 1 465 973 describes a coextruded polyester film having two layers, one layer of which consists of copolyesters containing isophthalic acid and terephthalic acid, and the other layer of which consists of polyethylene terephthalate. The patent gives no useful indication of the sealing performance of the film. The lack of pigmentation means that the film cannot be produced by a reliable process (cannot be wound up) and that the possibilities for further processing of the film are limited.

EP-A 0 035 835 describes a coextruded, sealable polyester film where, in the sealable layer, particles whose average size exceeds the sealable layer thickness are present in order to improve winding and processing performance. The particulate additives form surface protrusions which prevent undesired blocking and sticking of the film to rolls or guides. No further details are given concerning the incorporation of antiblocking agents in relation to the other, nonsealable layer of the film. It is uncertain whether this layer comprises antiblocking agents. The choice of particles having diameters greater than that of the sealable layer, at the concentrations given in the examples, impairs the sealing performance of the film. The patent does not give any indication of the sealing temperature range of the film. The seal seam strength is measured at 140° C. and is in the range from 63 to 120 N/m (from 0.97 N/15 mm to 1.8 N/15 mm of film width).

EP-A 0 432 886 describes a coextruded multilayer polyester film which has a surface on which has been arranged a sealable layer, and has a second surface on which has been arranged an acrylate layer. The sealable outer layer here may also be composed of isophthalic-acid-containing and terephthalic-acid-containing copolyesters. The coating on the reverse side gives the film improved processing performance. The patent gives no indication of the sealing temperature range of the film. The seal seam strength is measured at 140° C. For a sealable layer thickness of 11 μm the seal seam strength given is 761.5 N/m (11.4 N/15 mm). A disadvantage of the reverse-side acrylate coating is that this side is now not sealable with respect to the sealable outer layer, and the film therefore has only very restricted use.

EP-A 0 515 096 describes a coextruded, multilayer, sealable polyester film which comprises a further additive in the sealable layer. The additive may comprise inorganic particles, for example, and is preferably distributed in an aqueous layer onto the film during its production. Using this method, the film is claimed to retain its good sealing properties and to be easy to process. The reverse side comprises only very few particles, most of which pass into this layer via the recycled material. This patent again gives no indication of the sealing temperature range of the film. The seal seam strength is measured at 140° C. and is above 200 N/m (3 N/15 mm). For a sealable layer of 3 μm thickness the seal seam strength given is 275 N/m (4.125 N/15 mm).

WO 98/06575 describes a coextruded, multilayer polyester film which comprises a sealable outer layer and a nonsealable base layer. The base layer here may have been built up from one or more layers, and the inner layer of these layers is in contact with the sealable layer. The other (outward-facing) layer then forms the second nonsealable outer layer. Here, too, the sealable outer layer may be composed of isophthalic-acid-containing and terephthalic-acid-containing copolyesters, but these comprise no antiblocking particles. The film also comprises at least one UV absorber, which is added to the base layer in a ratio of from 0.1 to 10% by weight. The base layer has conventional antiblocking agents. The film has good sealability, but does not have the desired processing performance and also has shortcomings in optical properties. The film may also have a matt surface, but then has high haze, which is undesirable.

Films in which no UV-absorbing materials are present exhibit yellowing and impairment of mechanical properties after even a short period in outdoor applications, due to photooxidative degradation by sunlight.

Good mechanical properties include a high modulus of elasticity ($E_{MD}$>3200 N/mm$^2$; $E_{TD}$>3500 N/mm$^2$) and good values for tensile stress at break (in MD>100 N/mm$^2$; in TD>130 N/mm$^2$).

It was an object of the present invention to eliminate the disadvantages of the prior art.

BRIEF DESCRIPTION OF THE INVENTION

The invention provides a UV-resistant, sealable, coextruded, biaxially oriented polyester film with one matt side and with at least one base layer B, and with a sealable outer layer A, and with another, matt, outer layer C, where at least one layer comprises a UV absorber and where the sealable outer layer A has a minimum sealing temperature of 110° C. and a seal seam strength of at least 1.3 N/15 mm, and the topographies of the two outer layers A and C are characterized by the following features: sealable outer layer A:

$R_a$ value <30 nm value measured for gas flow 500–4000 s nonsealable, matt outer layer C:

200 nm<$R_a$<1000 nm value measured for gas flow <50 s.

The invention further relates to the use of the film and to a process for its production.

DETAILED DESCRIPTION OF THE INVENTION

A transparent, UV-resistant, sealable, and biaxially oriented polyester film with one matt side is therefore provided and in particular has very good sealability, is cost-effective to produce, has improved processability, and has improved optical properties.

The invention permits the sealing range of the film to be extended to low temperatures, the seal seam strength of the film to be increased, and at the same time better handling of the film to be provided than in the prior art. It has also been ensured that the film is capable of processing even on high-speed machinery. Regrind arising directly during production of the film can be reintroduced to the extrusion process at a concentration of up to 60% by weight, based on the total weight of the film, without any significant resultant adverse effect on the physical properties of the film.

Since the film of the invention is particularly intended for outdoor applications and/or critical indoor applications, it is to have high UV resistance. High UV resistance means that sunlight or other UV radiation causes no, or only extremely little, damage to the films. In particular, when used outdoors for a number of years films should show no yellowing, embrittlement, or surface-cracking, and should have unimpaired mechanical properties. High UV resistance means that the film absorbs UV light and does not begin to transmit light until the visible region has been reached.

The UV stabilizer(s) is/are advantageously fed directly in the form of masterbatch(es) during film production, the concentration of the UV stabilizer(s) preferably being in the range from 0.01 to 5.0% by weight, with preference from 0.1 to 3.0% by weight, based on the weight of the respective layer of the polyester used.

The film of the invention generally has at least three layers, the layers encompassed then being the base layer B, the sealable outer layer A, and the matt outer layer C.

At least 90% by weight of the base layer B of the film is generally composed of a thermoplastic polyester. Polyesters suitable for this purpose are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid (poly-1,4-cyclohexanedimethylene terephthalate, PCDT), or else made from ethylene glycol, naphthalene-2, 6-dicarboxylic acid and biphenyl-4,4'-dicarboxylic acid (polyethylene 2,6-naphthalate bibenzoate, PENBB). Preference is given to polyesters of which at least 90 mol %, preferably at least 95 mol %, is composed of ethylene glycol units and terephthalic acid units, or of ethylene glycol units and naphthalene-2,6-dicarboxylic acid units. The remaining monomer units derive from other aliphatic, cycloaliphatic or aromatic diols and, respectively, dicarboxylic acids, as may also occur in the layer A (or the layer C).

Other examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—$C_6H_4$—X—$C_6H_4$—OH, where X is —$CH_2$—, —$C(CH_3)_2$—, —$C(CF_3)_2$—, —O—, —S— or —$SO_2$—. Bisphenols of the formula HO—$C_6H_4$—$C_6H_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x, x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the $C_3$–$C_{19}$ alkanediacids are particularly suitable, and the alkane moiety here may be straight-chain or branched.

One way of preparing the polyesters is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well known polycondensation catalysts, such as antimony trioxide or titanium salts. Another equally good preparation method is the direct esterification process in the presence of polycondensation catalysts. This starts directly from the dicarboxylic acids and the diols.

The sealable outer layer A applied by coextrusion to the base layer B has been built up on the basis of polyester copolymers and essentially consists of amorphous copolyesters composed predominantly of isophthalic acid units and of terephthalic acid units, and of ethylene glycol units. The remaining monomer units derive from other aliphatic, cycloaliphatic or aromatic diols and, respectively, dicarboxylic acids, as may also occur in the base layer. Preferred copolyesters which provide the desired sealing properties are those which have been built up from ethylene terephthalate units and from ethylene isophthalate units and from ethylene glycol units. The proportion of ethylene terephthalate is from 40 to 95 mol %, and the corresponding proportion of ethylene isophthalate is from 60 to 5 mol %. Preference is given to copolyesters in which the proportion of ethylene terephthalate is from 50 to 90 mol % and the corresponding proportion of ethylene isophthalate is from 50 to 10 mol %, and particular preference is given to copolyesters in which the proportion of ethylene terephthalate is from 60 to 85 mol % and the corresponding proportion of ethylene isophthalate is from 40 to 15 mol %.

The preferred embodiment of the matt outer layer C comprises a blend or a mixture made from two components I and II, and, if desired, comprises additives in the form of inert inorganic antiblocking agents.

Component I of the mixture or of the blend is a polyethylene terephthalate homopolymer or polyethylene terephthalate copolymer or a mixture made from polyethylene terephthalate homo- or copolymers.

Component II of the copolymer or of the mixture or of the blend is a polyethylene terephthalate copolymer which is composed of the condensation product of the following monomers or of their derivatives capable of forming polyesters:

A) from 65 to 95 mol % of isophthalic acid;
B) from 0 to 30 mol % of at least one aliphatic dicarboxylic acid having the formula HOOC$(CH_2)_n$COOH, where n is from 1 to 11;
C) from 5 to 15 mol % of at least one sulfomonomer containing an alkali metal sulfonate group on the aromatic moiety of a dicarboxylic acid;
D) the stoichiometric amount of a copolymerizable aliphatic or cycloaliphatic glycol having from 2 to 11 carbon atoms needed to form 100 mol % of condensate;

each of the percentages given being based on the total amount of the monomers forming component II. For a detailed description of component II see also EP-A-0 144 878, which is expressly incorporated herein by way of reference.

For the purposes of the present invention, mixtures are mechanical mixtures which are prepared from the separate components. For this, the separate constituents are generally combined in the form of small-dimensioned compressed moldings, e.g. lenticular or bead-shaped pellets, and mixed with one another mechanically, using a suitable agitator. Another way of producing the mixture is to feed components I and II in pellet form separately to the extruder for the outer layer of the invention, and to carry out mixing in the extruder and/or in the downstream systems for melt transportation.

For the purposes of the present invention, a blend is an alloy-like composite of the separate components I and II which can no longer be separated into the initial constituents. A blend has properties like those of a homogeneous material and can therefore be characterized by appropriate parameters.

The ratio (ratio by weight) of the two components I and II of the outer layer mixture or of the blend can be varied within wide limits and depends on the intended use of the multilayer film. The ratio of components I and II is preferably in the range from I:II=10:90 to I:II=95:5, preferably from I:II=20:80 to I:II=95:5, and in particular from I:II=30:70 to I:II=95:5.

The desired sealing properties, the desired degree of mattness, and the desired processing properties of the film of the invention are obtained by combining the properties of the copolyester used for the sealable outer layer with the topographies of the sealable outer layer A and of the nonsealable, matt outer layer C.

The minimum sealing temperature of 110° C. and the seal seam strength of at least 1.3 N/15 mm are achieved when the copolymers described in more detail above are used for the sealable outer layer A. The films have their best sealing properties when no other additives, in particular no inorganic or organic fillers, are added to the copolymer. In this case, with the copolyester given above, the lowest minimum sealing temperature and the highest seal seam strengths are obtained. However, the handling of the film is poor in this case, since the surface of the sealable outer layer A has a marked tendency to block. The film can hardly be wound and has little suitability for further processing on high-speed packaging machinery. To improve handling of the film, and processability, it is necessary to modify the sealable outer layer A. This is best done with the aid of suitable antiblocking agents of a selected size, which are added to the sealable layer at a particular concentration, and specifically in such a way as to firstly minimize blocking and secondly give only insignificant impairment of sealing properties. This desired combination of properties can be achieved when the topography of the sealable outer layer A is characterized by the following set of parameters:

The roughness of the sealable outer layer, characterized by the $R_a$ value, is generally less than 30 nm, preferably less than 25 nm, otherwise the sealing properties are adversely affected for the purposes of the present invention.

The value measured for gas flow should be from 500 to 4000 s, preferably from 600 to 3500 s. At values below 500 s the sealing properties are adversely affected for the purposes of the present invention, and at values above 4000 s the handling of the film becomes poor.

The nonsealable, matt outer layer C is characterized by the following set of parameters:

The roughness of the matt outer layer, characterized by the $R_a$ value, is in the range from 200 to 1000 nm, preferably from 220 to 900 nm. Values below 200 nm have an adverse effect on the winding and processing performance of the film, and on the degree of mattness of the surface. Values above 1000 nm impair the optical properties (haze) of the film.

The value measured for gas flow should be $\leq 50$ s, preferably $\leq 45$ s. At values above 50 the degree of mattness of the film is adversely affected.

The UV stabilizers selected for rendering the film of the invention UV-resistant may in principle be any organic or inorganic UV stabilizers suitable for incorporation within polyesters. Suitable UV stabilizers of this type are known from the prior art and are described in more detail in WO 98/06575, in EP-A-0 144 878, in EP-A-0 031 202, EP-A-0 031 203 or in EP-A-0 076 582, for example.

UV stabilizers, i.e. light stabilizers which are UV absorbers, are generally chemical compounds which can intervene in the physical and chemical processes of light-induced degradation. Carbon black and other pigments can give some protection from light. However, these substances are unsuitable for transparent films, since they cause discoloration or color change. The only compounds suitable for transparent films are those organic or organometallic compounds which produce no, or only extremely slight, color or color change in the thermoplastic to be stabilized.

Suitable UV stabilizers are those which absorb at least 70%, preferably 80%, particularly preferably 90%, of the UV light in the wavelength region from 180 to 380 nm, preferably from 280 to 360 nm. These are particularly suitable if they are thermally stable in the temperature range from 260 to 300° C., i.e. do not decompose and do not cause evolution of gas. Examples of suitable UV stabilizers are 2-hydroxybenzophenones, 2-hydroxybenzotriazoles, organonickel compounds, salicylic esters, cinnamic ester derivatives, resorcinol monobenzoates, oxanilides, hydroxybenzoates, sterically hindered amines and/or triazines, preferably the 2-hydroxybenzotriazoles and the triazines.

In one preferred embodiment, the film of the invention comprises, as UV-absorbing substance, from 0.01 to 5.0% by weight of 2-(4,6-diphenyl-1,3,5-triazin-2-yl)-5-hexyloxyphenol or from 0.01 to 5.0% by weight of 2,2'-methylenebis(6-(2H-benzotriazol-2-yl)-4-(1,1,2,2-tetramethylpropyl)phenol). It is also possible to use a mixture of these two UV stabilizers or a mixture of at least one of these two UV stabilizers with other UV stabilizers, and here the total concentration of light stabilizer is preferably from 0.01 to 5.0% by weight, based on the weight of the thermoplastic polyester.

In the three-layer embodiment, the UV stabilizer is preferably present in the nonsealable outer layer C. However, if required, the base layer B or the sealable outer layer A may also have UV stabilizers. The concentration of the stabilizer(s) here is based on the weight of the thermoplastics in the layer which has UV stabilizer(s).

Surprisingly, weathering tests to the test specification ISO 4892 using the Atlas CI65 Weather-Ometer have shown that, to improve UV resistance, in the case of the abovementioned three-layer film it is fully sufficient for the outer layers of thickness from 0.3 to 2.5 µm to have UV stabilizers.

Weathering tests have shown that when films have been rendered UV-resistant according to the invention they generally show no yellowing, no embrittlement, no loss of surface gloss, no surface cracking and no impairment of mechanical properties even after an extrapolated 5 to 7 years of outdoor application in weathering tests.

The light stabilizer may be fed straightaway when the thermoplastic is prepared, or it may be fed into the extruder during film production.

It is preferable for the light stabilizer to be added by way of masterbatch technology. The additive is first fully dispersed in a carrier material. Carrier materials which may be used are the actual thermoplastic used, e.g. polyethylene terephthalate, or else other polymers sufficiently compatible therewith. After feeding into the thermoplastic for film production, the constituents of the masterbatch melt during the extrusion process and thus become dissolved in the thermoplastic.

The concentration of the UV absorber alongside the thermoplastic in the masterbatch is from 2.0 to 50.0% by weight, preferably from 5.0 to 30.0% by weight, the constituents always giving 100% by weight in total.

An important factor in masterbatch technology is that the particle size and the bulk density of the masterbatch are similar to the particle size and bulk density of the thermoplastic, enabling homogeneous dispersion and thus homogeneous UV resistance.

A film of this type is therefore also cost-effective.

It is moreover very surprising that regrind produced from the films or from the moldings is reusable without any adverse effect on the Yellowness Index of the film.

The base layer B may also comprise customary additives, such as stabilizers and/or antiblocking agents. The two other layers A and C may also comprise these additives. It is appropriate for these to be added to the polymer or, respectively, polymer mixture straight away prior to melting. Examples of stabilizers used are phosphorus compounds, such as phosphoric acid or phosphoric esters.

Suitable antiblocking agents (in this context also termed pigments) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc or manganese salts of the dicarboxylic acids used, carbon black, titanium dioxide, kaolin or crosslinked polystyrene particles or crosslinked acrylate particles.

The antiblocking agents selected may also be mixtures of two or more different antiblocking agents or mixtures of antiblocking agents of the same composition but different particle size. The particles may be added to the individual layers at the respective advantageous concentrations, e.g. as a glycolic dispersion during the polycondensation or by way of masterbatches during extrusion.

Preferred particles are $SiO_2$ in colloidal or in chain form. These particles become very well bound into the polymer matrix and create only very few vacuoles. Vacuoles generally cause haze and it is therefore appropriate to avoid these. There is no restriction in principle on the diameters of the particles used. However, it has proven appropriate for achieving the object to use particles with an average primary particle diameter below 100 nm, preferably below 60 nm and particularly preferably below 50 nm, and/or particles with an average primary particle diameter above 1 $\mu$m, preferably above 1.5 $\mu$m and particularly preferably above 2 $\mu$m. However, the average particle diameter of these particles described last should not be above 5 $\mu$m.

To achieve the abovementioned properties of the sealable film, it has also proven to be appropriate to select the particle concentration in the base layer B to be lower than in the two outer layers A and C. In a three-layer film of the type mentioned the particle concentration in the base layer B will be from 0 to 0.15% by weight, preferably from 0.001 to 0.12% by weight and in particular from 0.002 to 0.10% by weight. There is no restriction in principle on the diameter of the particles used, but particular preference is given to particles with an average diameter above 1 mm.

In its advantageous usage form, the film of the invention is composed of three layers: the base layer B and, applied on both sides of this base layer, outer layers A and C, and outer layer A is sealable with respect to itself and with respect to outer layer C.

To achieve the property profile mentioned for the film, the outer layer C has more pigment (i.e. higher pigment concentration) than the outer layer A. The pigment concentration in this second, matt outer layer C is from 1.0 to 10.0%, advantageously from 1.5 to 10% and in particular from 2.0 to 10%. In contrast, the other outer layer A, which is sealable and positioned opposite to the outer layer C, has a lower degree of filling with inert pigments. The concentration of the inert particles in layer A is from 0.01 to 0.2% by weight, preferably from 0.015 to 0.15% by weight and in particular from 0.02 to 0.1% by weight.

Between the base layer and the outer layers there may, if desired, also be an intermediate layer. This may again be composed of the polymers described for the base layers. In one particularly preferred embodiment, it is composed of the polyester used for the base layer. It may also comprise the customary additives described. The thickness of the intermediate layer is generally above 0.3 $\mu$m, preferably in the range from 0.5 to 15 $\mu$m, in particular in the range from 1.0 to 10 $\mu$m and very particularly preferably in the range from 1.0 to 5 $\mu$m.

In the particularly advantageous three-layer embodiment of the film of the invention, the thickness of the outer layers A and C is generally above 0.1 $\mu$m, and is generally in the range from 0.2 to 4.0 $\mu$m, advantageously in the range from 0.2 to 3.5 $\mu$m, in particular in the range from 0.3 to 3 $\mu$m and very particularly preferably in the range from 0.3 to 2.5 $\mu$m, and the thicknesses of the outer layers A and C may be identical or different.

The total thickness of the film of the invention may vary within certain limits. It is from 3 to 100 $\mu$m, in particular from 4 to 80 $\mu$m, preferably from 5 to 70 $\mu$m, the layer B preferably making up from 5 to 90% of the total thickness.

The polymers for the base layer B and the two outer layers A and C are introduced to three extruders. Any foreign bodies or contamination present may be filtered out from the polymer melt prior to extrusion. The melts are then extruded through a coextrusion die to give flat melt films, and layered one upon the other. The multilayer film is then drawn off and solidified with the aid of a chill roll and, if desired, other rolls.

The film of the invention is generally produced by the coextrusion process known per se.

The procedure for this process is that the melts corresponding to the individual layers of the film are coextruded through a flat-film die, the resultant film is drawn off for solidification on one or more rolls, the film is then biaxially stretched (oriented), and the biaxially stretched film is heat-set and, if desired, corona- or flame-treated on the surface layer intended for treatment.

The biaxial stretching (orientation) is generally carried out sequentially, and preference is given to sequential biaxial stretching in which stretching is first longitudinal (in the machine direction) and then transverse (perpendicular to the machine direction).

As is usual in coextrusion, the polymer or the polymer mixture for the individual layers is first compressed and plasticized in an extruder, and any additives used may already be present in the polymer or the polymer mixture during this process. The melts are then simultaneously extruded through a flat-film die (slot die), and the extruded multilayer film is drawn off on one or more take-off rolls, whereupon it cools and solidifies.

The biaxial orientation is generally carried out sequentially, preferably orienting first longitudinally (i.e. in the machine direction=MD) and then transversely (i.e. perpendicularly to the machine direction=TD). This gives orientation of the molecular chains. The longitudinal orientation can be carried out with the aid of two rolls running at different speeds corresponding to the desired stretching ratio. For the transverse orientation use is generally made of an appropriate tenter frame.

The temperature at which the orientation is carried out may vary over a relatively wide range and depends on the film properties desired. The longitudinal stretching is generally carried out at from 80 to 130° C., and the transverse stretching at from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. Prior to the transverse stretching, one or both surfaces of the film may be in-line coated by known processes. The in-line coating may serve, for example, to give improved adhesion of the metal layer or of any printing ink applied, or else to improve antistatic performance or processing performance.

For producing a film with very good sealing properties it has proven advantageous for the planar orientation Δp of the film to be less than Δp0.165, but particularly less than Δp0.163. In this case the strength of the film in the direction of its thickness is so great that when the seal seam strength is measured it is specifically the seal seam which separates, and the tear does not enter the film or propagate therein.

The significant variables affecting the planar orientation Δp have been found to be the longitudinal and transverse stretching parameters, and also the SV value of the raw material used. The process parameters include in particular the longitudinal and transverse stretching ratios ($\lambda_{MD}$ and $\lambda_{TD}$), the longitudinal and transverse stretching temperatures ($T_{MD}$ and $T_{TD}$), the film web speed and the nature of the stretching, in particular that in the longitudinal direction of the machine. For example, if the planar orientation obtained with a machine is Δp0.167 with the following set of parameters: $\lambda_{MD}$=4.8 and $\lambda_{TD}$=4.0, a longitudinal stretching temperature $T_{MD}$ of from 80–118° C. and a transverse stretching temperature $T_{TD}$ of from 80–125° C., then increasing the longitudinal stretching temperature $T_{MD}$ to 80–125° C. or increasing the transverse stretching temperature $T_{TD}$ to 80–135° C., or lowering the longitudinal stretching ratio $\lambda_{MD}$ to 4.3 or lowering the transverse stretching ratio $\lambda_{TD}$ to 3.7 gives a planar orientation Δp within the desired range. The film web speed here was 340 m/min and the SV value for the material was about 730. For the longitudinal stretching, the data mentioned are based on what is known as N-TEP stretching, composed of a low-orientation stretching step (LOE, Low Orientation Elongation) and a high-orientation stretching step (REP, Rapid Elongation Process). Other stretching systems in principle give the same ratios, but the numeric values for each process parameter may be slightly different. The temperatures given are based on the respective roll temperatures in the case of the longitudinal stretching and on infrared-measured film temperatures in the case of the transverse stretching.

In the heat-setting which follows, the film is held for from 0.1 to 10 s at a temperature of from 150 to 250° C. The film is then wound up in a usual manner.

After the biaxial stretching it is preferable for one or both surfaces of the film to be corona- or flame-treated by one of the known methods. The intensity of the treatment is generally in the range above 45 mN/m.

The film may also be coated in order to achieve other desired properties. Typical coatings are layers with adhesion-promoting, antistatic, slip-improving or release action. These additional layers may be applied to the film by way of in-line coating, using aqueous dispersions, prior to the transverse stretching step.

The film of the invention has excellent sealability, very good UV resistance, very good handling properties and very good processing performance. The sealable outer layer A of the film seals not only with respect to itself (fin sealing) but also with respect to the nonsealable outer layer C (lap sealing). The minimum sealing temperature for lap sealing is only about 10 K higher, and the reduction in seal seam strength is not more than 0.3 N/15 mm.

Compared with prior art films, mattness has also been improved while at the same time reducing the haze of the film. It has been ensured that regrind can be reintroduced to the extrusion process during film production at a concentration of from 20 to 60% by weight, based on the total weight of the film, without any significant resultant adverse effect on the physical properties of the film.

The excellent sealing properties, very good handling, and very good processing properties of the film make it particularly suitable for processing on high-speed machinery.

The excellent combination of properties possessed by the films of the invention, furthermore, makes them, and articles produced therefrom, suitable for a wide variety of different applications, for example for interior decoration, for constructing exhibition stands or for exhibition requisites, as displays, for placards, for protective glazing of machines or of vehicles, in the lighting sector, in the fitting out of shops or of stores, or as a promotional requisite or laminating medium.

Good UV resistance moreover makes the film suitable for outdoor applications, e.g. for greenhouses, or the advertising sector, roofing systems, exterior cladding, protective coverings for materials, including the protection of metallic surfaces, e.g. of steel sheet, construction sector applications and illuminated advertising profiles.

The outer layer C has a characteristic matt, antireflective surface, making it particularly attractive for the applications mentioned.

The table below (Table 1) gives the most important film properties according to the invention.

TABLE 1

|  | Range according to the invention | Preferred | Particularly preferred | Unit | Test method |
|---|---|---|---|---|---|
| Outer layer A |  |  |  |  |  |
| Minimum sealing temperature | <110 | <105 | <100 | ° C. | internal |
| Seal seam strength | >1.3 | >1.5 | >1.8 | N/15 mm | internal |
| Average roughness $R_a$ | <30 | <25 | <20 | nm | DIN 4768, cut-off 0.25 mm |
| Range of values for gas flow measurement | 500–4000 | 800–3500 | 1000–3000 | sec | internal |
| Gloss, 20° | >120 | >130 | >140 |  | DIN 67 530 |
| Outer layer C |  |  |  |  |  |
| COF | <0.5 | <0.45 | <0.40 |  | DIN 53 375 |
| Average roughness $R_a$ | 200–1000 | 225–900 | 250–800 | nm | DIN 4768, cut-off 0.25 mm |
| Range of values for gas flow measurement | <50 | <45 | <49 | sec | internal |
| Gloss, 60° | <60 | <55 | <50 |  | DIN 67 530 |

TABLE 1-continued

| | Range according to the invention | Preferred | Particularly preferred | Unit | Test method |
|---|---|---|---|---|---|
| Other film properties | | | | | |
| Haze | <40 | <35 | <30 | % | ASTM D1003-52 |
| Planar orientation | <0.1650 | <0.163 | <0.160 | | internal |
| Weathering test, UV resistance Change in properties[i] | <20% | | | | ISO 4892 |

[i]The films were weathered on both sides, in each case for 1000 hours per side, using the Atlas Ci65 Weather-Ometer to the test specification ISO 4892, and then tested for mechanical properties, discoloration, surface defects, haze and gloss.

Each of the properties in the examples below was measured to the following standards or by the following methods.

Test Methods

SV (DCA), IV (DVE)

Standard viscosity SV (DCA) is measured in dichloroacetic acid by a method based on DIN 53726.

The intrinsic viscosity (IV) is calculated as follows from the standard viscosity $$IV\ (DCA) = 6.67 \cdot 10^{-4} SV \cdot (DCA) + 0.118$$

Determination of Minimum Sealing Temperature

Hot-sealed specimens (seal seam 20 mm×100 mm) are produced with a Brugger HSG/ET sealing apparatus, by sealing the film at different temperatures with the aid of two heated sealing jaws at a sealing pressure of 2 bar and with a sealing time of 0.5 s. From the sealed specimens test strips of 15 mm width were cut. The T-seal seam strength was measured as in the determination of seal seam strength. The minimum sealing temperature is the temperature at which a seal seam strength of at least 0.5 N/15 mm is achieved.

Seal Seam Strength

To determine seal seam strength, two film strips of width 15 mm were placed one on top of the other and sealed at 130° C. with a sealing time of 0.5 s and a sealing pressure of 2 bar (apparatus: Brugger model NDS, single-side-heated sealing jaw). The seal seam strength was determined by the T-peel method.

Coefficient of Friction

Coefficient of friction was determined to DIN 53 375. The coefficient of sliding friction was measured 14 days after production.

Surface Tension

Surface tension was determined by what is known as the ink method (DIN 53 364).

Haze

Hölz haze was measured by a method based on ASTM-D 1003-52 but, in order to utilize the most effective measurement range, measurements were made on four pieces of film laid one on top of the other, and a 1° slit diaphragm was used instead of a 40° pinhole.

Gloss

Gloss was determined to DIN 67 530. The reflectance was measured as an optical value characteristic of a film surface. Based on the standards ASTM-D 523-78 and ISO 2813, the angle of incidence was set at 20°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

Surface Gas Flow Time

The principle of the test method is based on the air flow between one side of the film and a smooth silicon wafer sheet. The air flows from the surroundings into an evacuated space, and the interface between film and silicon wafer sheet acts as a flow resistance.

A round specimen of film is placed on a silicon wafer sheet in the middle of which there is a hole providing the connection to the receiver. The receiver is evacuated to a pressure below 0.1 mbar. The time in seconds taken by the air to establish a pressure rise of 56 mbar in the receiver is determined.

Test Conditions:

| | |
|---|---|
| Test area | 45.1 cm$^2$ |
| Weight applied | 1276 g |
| Air temperature | 23° C. |
| Humidity | 50% relative humidity |
| Aggregated gas volume | 1.2 cm$^3$ |
| Pressure difference | 56 mbar |

Determination of Planar Orientation Δp

Planar orientation is determined by measuring the refractive index with an Abbe refractometer.

Preparation of Specimens

Specimen size and length: from 60 to 100 mm

Specimen width: corresponds to prism width of 10 mm

To determine $n_{MD}$ and $n_a$ (=$n_z$), the specimen to be tested has to be cut out from the film with the running edge of the specimen running precisely in the direction TD. To determine $n_{TD}$ and $n_a$ (=$n_z$), the specimen to be tested has to be cut out from the film with the running edge of the specimen running precisely in the direction MD. The specimens are to be taken from the middle of the film web. Care must be taken that the temperature of the Abbe refractometer is 23° C. Using a glass rod, a little diiodomethane (N=1.745) or diiodomethane-bromonaphthalene mixture is applied to the lower prism, which has been cleaned thoroughly before the test. The refractive index of the mixture must be greater than 1.685. The specimen cut out in the direction TD is firstly laid on top of this, in such a way that the entire surface of the prism is covered. Using a paper wipe, the film is now firmly pressed flat onto the prism, so that it is firmly and smoothly positioned thereon. The excess liquid must be sucked away. A little of the test liquid is then dropped onto the film. The second prism is swung down and into place and pressed firmly into contact. The right-hand knurled screw is then used to turn the indicator scale until a transition from light to dark can be seen in the field of view in the range from 1.62 to 1.68. If the transition from light to dark is not sharp, the colors are brought together using the upper knurled screw in such a way that only one light and one dark zone are visible.

The sharp transition line is brought to the crossing point of the two diagonal lines (in the eyepiece) using the lower knurled screw. The value now indicated on the measurement scale is read off and entered into the test record. This is the refractive index $n_{MD}$ in the machine direction. The scale is now turned using the lower knurled screw until the range visible in the eyepiece is from 1.49 to 1.50.

The refractive index $n_a$ or $n_z$ (in the direction of the thickness of the film) is then determined. To improve the visibility of the transition, which is only weakly visible, a polarization film is placed over the eyepiece. This is turned until the transition is clearly visible. The same considerations apply as in the determination of $n_{MD}$. If the transition from light to dark is not sharp (colored), the colors are brought together using the upper knurled screw in such a way that a sharp transition can be seen. This sharp transition line is placed on the crossing point of the two diagonal lines using the lower knurled screw, and the value indicated on the scale is read off and entered into the table.

The specimen is then turned, and the corresponding refractive indices $n_{MD}$ and $n_a$ (=$n_z$) of the other side are measured and entered into an appropriate table. After determining the refractive indices in, respectively, the direction MD and the direction of the thickness of the film, the specimen strip cut out in the direction MD is placed in position and the refractive indices $n_{TD}$ and $n_\alpha$ (=$n_z$) are determined accordingly. The strip is turned over, and the values for the B side are measured. The values for the A side and the B side are combined to give average refractive indices. The orientation values are then calculated from the refractive indices using the following formulae:

$$\Delta n = n_{MD} - n_{TD}$$
$$\Delta p = (n_{MD} + n_{TD})/2 - n_z$$
$$n_{av} = (n_{MD} + n_{TD} + n_z)/3$$

Surface Defects

Surface defects are determined visually.

Mechanical Properties

Modulus of elasticity, tear strength and elongation at break are measured longitudinally and transversely to ISO 527-1-2.

Weathering (on Both Sides), UV Resistance

UV resistance is tested as follows to the test specification ISO 4892

| Test apparatus: | Atlas Ci65 Weather-Ometer |
|---|---|
| Test conditions: | ISO 4892, i.e. artificial weathering |
| Irradiation time: | 1000 hours (per side) |
| Irradiation: | 0.5 W/m$^2$, 340 nm |
| Temperature: | 63° C. |
| Relative humidity: | 50% |
| Xenon lamp: | inner and outer filter made from borosilicate |
| Irradiation cycles: | 102 minutes of UV light, then 18 minutes of UV light with water spray on the specimens, then again 102 minutes of UV light, etc. |

Color Change

The change in color of the specimens after artificial weathering is measured using a spectrophotometer to DIN 5033.

The greater the numerical deviation from standard, the greater the color difference. Numerical values of 0.3 can be neglected and indicate that there is no significant color change.

Yellowness

The Yellowness Index (YI) is the deviation from the colorless condition in the "yellow" direction, and is measured to DIN 6167. Yellowness values (YI)<5 are not visually detectable.

EXAMPLES

In the following examples and comparative examples in each case use films of different thickness produced by a known extrusion process.

Example 1

Chips made from polyethylene terephthalate (prepared by the transesterification process with Mn as transesterification catalyst, Mn concentration: 100 ppm) were dried at 150° C. to residual moisture below 100 ppm and fed to the extruder for the base layer B. Chips made from polyethylene terephthalate and from a filler were likewise fed to the extruder for the nonsealable outer layer C.

Alongside this, chips were prepared made from a linear polyester which is composed of an amorphous copolyester with 78 mol % of ethylene terephthalate and 22 mol % of ethylene isophthalate (prepared via the transesterification process with Mn as transesterification catalyst, Mn concentration: 100 ppm). The copolyester was dried at a temperature of 100° C. to a residual moisture below 200 ppm and fed to the extruder for the sealable outer layer A.

The UV stabilizer 2-(4,6-diphenyl-1,3,5-triazin-2-yl)-5-hexyloxyphenol (®Tinuvin 1577) is fed in the form of masterbatches. The masterbatches are composed of 5% by weight of Tinuvin 1577 as active component and 95% by weight of polyethylene terephthalate (for outer layer C) and, respectively, 95% by weight of polyethylene isophthalate (for outer layer A). The 5% by weight strength Tinuvin 1577 is fed only to the two thick outer layers, 20% by weight of the respective masterbatches, by way of masterbatch technology.

Coextrusion, followed by stepwise longitudinal and transverse orientation, is used to produce a transparent three-layer film with ABC structure and with a total thickness of 12 µm. The thickness of each outer layer can be found in Table 2.

| Outer layer A is a mixture made from: | |
|---|---|
| 20.0% | by weight of UV masterbatch based on polyethylene isophthalate |
| 77.0% | by weight of copolyester with an SV of 800 |
| 3.0% | by weight of masterbatch made from 97.75% by weight of copolyester (SV of 800) and 1.0% by weight of ® Sylobloc 44 H (synthetic SiO$_2$ from Grace) and 1.25% by weight of ® Aerosil TT 600 (fumed SiO$_2$ from Degussa) |
| Base layer B: | |
| 100.0% | by weight of polyethylene terephthalate with an SV of 800 |
| Outer layer C is a mixture made from: | |
| 20.0% | by weight of UV masterbatch based on polyethylene terephthalate |
| 65.0% | by weight of polyethylene terephthalate with an SV of 800 (=component I) |
| 15.0% | by weight of component II |

Component II was prepared as described in more detail in Example 1 of EP-A-0 144 878.

The production conditions in the individual steps of the process were:

| Extrusion: | Temperatures | Layer A: 270° C. |
| --- | --- | --- |
| | | Layer B: 290° C. |
| | | Layer C: 290° C. |
| | Die gap width: | 2.5 mm |
| | Take-off roll | |
| | Temperature: | 30° C. |
| Longitudinal stretching: | Temperature: | 80–125° C. |
| | Longitudinal stretching ratio: | 4.2 |
| Transverse stretching: | Temperature: | 80–135° C. |
| | Transverse stretching ratio: | 4.0 |
| Heat-setting: | Temperature: | 230° C. |
| Duration: | | 3 s |

The film had the required good sealing properties and the desired mattness, and exhibits the desired handling and the desired processing performance. The film structure and the properties achieved in films prepared in this way are given in Tables 2 and 3.

The films in this example, and in all of the examples below, were weathered on both sides, in each case for 1000 hours per side, using the Atlas Ci65 Weather-Ometer to test specification ISO 4892 and then tested for mechanical properties, discoloration, surface defects, haze and gloss.

Example 2

In comparison with Example 1, the outer layer thickness of the sealable layer A was raised from 1.5 to 2.0 μm. This has given improved sealing properties, and in particular the seal seam strength has increased markedly.

Example 3

In comparison with Example 1, the film produced now had a thickness of 20 μm. The outer layer thickness for the sealable layer A was 2.5 μm and that for the nonsealable layer C was 2.0 μm. This has again improved sealing properties, and in particular seal seam strength has increased markedly, and the handling properties of the film have improved slightly.

Example 4

In comparison with Example 3, the copolymer for the sealable outer layer A has been changed. Instead of the amorphous copolyester with 78 mol % of polyethylene terephthalate and 22 mol % of ethylene terephthalate, use was now made of an amorphous copolyester with 70 mol % of polyethylene terephthalate and 30 mol % of ethylene terephthalate. The polymer was processed in a twin-screw vented extruder, without any need for predrying. The outer layer thickness for the sealable layer A was again 2.5 μm, and that for the nonsealable layer C was 2.0 μm. This has given improved sealing properties, and in particular the seal seam strength has increased markedly. To achieve good handling properties and good processing performance from the film, the pigment concentration in the two outer layers was raised slightly.

Comparative Example 1

In comparison with Example 1, the sealable outer layer A was now not pigmented. Although this has given some improvement in the sealing properties, the handling properties of the film and its processing performance have worsened unacceptably.

Comparative Example 2

In comparison with Example 1, the level of pigmentation in the sealable outer layer A was now as high as in the nonsealable outer layer C. This measure has improved the handling properties and the processing properties of the film, but the sealing properties have worsened markedly.

Comparative Example 3

In comparison with Example 1, the nonsealable outer layer A was now pigmented to a markedly lower level. The handling properties of the film and its processing performance have worsened markedly.

Comparative Example 4

Example 1 from EP-A 0 035 835 was repeated. The sealing performance of the film, its handling properties and its processing performance are poorer than in the examples according to the invention.

TABLE 2

| Example | Film thickness μm | Film structure | Layer thicknesses μm | | | Pigments in layers | | | Average pigment diameter in layers mm | | | Pigment concentrations ppm | | |
| --- | --- | --- | --- | --- | --- | --- | --- | --- | --- | --- | --- | --- | --- | --- |
| | | | A | B | C | A | B | C | A | B | C | A | B | C |
| E 1 | 12 | ABC | 1.5 | 9 | 1.5 | Sylobloc 44 H Aerosil TT 600 | none | 0 | 2.5 0.04 | | 2.5 0.04 | 300 375 | 0 | 0 |
| E 2 | 12 | ABC | 2.0 | 8.5 | 1.5 | Sylobloc 44 H Aerosil TT 600 | none | 0 | 2.5 0.04 | | 2.5 0.04 | 300 375 | 0 | 0 |
| E 3 | 20 | ABC | 2.5 | 15.5 | 2.0 | Sylobloc 44 H Aerosil TT 600 | none | 0 | 2.5 0.04 | | 2.5 0.04 | 300 375 | 0 | 0 |
| E 4 | 20 | ABC | 2.5 | 15.5 | 2.0 | Sylobloc 44 H Aerosil TT 600 | none | 0 | 2.5 0.04 | | 2.5 0.04 | 400 500 | 0 | 0 |
| CE 1 | 12 | ABC | 1.5 | 9 | 1.5 | none | none | Sylobloc 44 H Aerosil TT 600 | | | 2.5 0.04 | | 0 | 1200 1500 |

TABLE 2-continued

| Example | Film thickness μm | Film structure | Layer thicknesses μm A | B | C | Pigments in layers A | B | C | Average pigment diameter in layers mm A | B | C | Pigment concentrations ppm A | B | C |
|---|---|---|---|---|---|---|---|---|---|---|---|---|---|---|
| CE 2 | 12 | ABC | 1.5 | 9 | 1.5 | Sylobloc 44 H Aerosil TT 600 | none | Sylobloc 44 H Aerosil TT 600 | 2.5 0.04 | | 2.5 0.04 | 300 375 | 0 | 1200 1500 |
| CE 3 | 12 | ABC | 1.5 | 9 | 1.5 | Sylobloc 44 H Aerosil TT 600 | none | Sylobloc 44 H Aerosil TT 600 | 2.5 0.04 | | 2.5 0.04 | 300 375 | 0 | 600 750 |
| CE 4 | 15 | AB | 2.25 | 12.75 | | Gasil 35 EP-A 035 835 | none | | 3 | | | 2500 | 0 | |

TABLE 3

| Example | Minimum sealing temperature side A with respect to side A | Seal seam strength side A with respect to side A | Coefficient of friction COF side C with respect to side C | Average roughness $R_a$ side A | side C | Values measured for gas flow side A | side C | Dp | Gloss side A | side C | Haze | Winding performance and handling properties | Processing performance |
|---|---|---|---|---|---|---|---|---|---|---|---|---|---|
| E 1 | 100 | 2.0 | 0.45 | 25 | 340 | 1200 | 20 | 0.165 | 140 | 50 | 32 | ++ | ++ |
| E 2 | 98 | 2.7 | 0.45 | 26 | 340 | 1280 | 20 | 0.165 | 140 | 50 | 32 | ++ | ++ |
| E 3 | 95 | 3.0 | 0.41 | 23 | 340 | 1110 | 20 | 0.165 | 130 | 45 | 34 | ++ | ++ |
| E 4 | 85 | 3.3 | 0.40 | 23 | 340 | 1300 | 20 | 0.165 | 130 | 45 | 34 | ++ | ++ |
| CE 1 | 98 | 2.1 | 0.45 | 10 | 65 | 10,000 | 80 | 0.165 | 160 | 170 | 1.5 | − | − |
| CE 2 | 110 | 1.0 | 0.45 | 65 | 65 | 80 | 80 | 0.165 | 130 | 170 | 2.8 | − | − |
| CE 3 | 100 | 2.0 | 0.45 | 25 | 37 | 1200 | 150 | 0.165 | 160 | 190 | 1.5 | − | − |
| CE 4 | 115 | 0.97 | >2 | 70 | 20 | 50 | >5000 | | | | 12 | − | − |

Key to winding performance, handling properties and processing performance of films:
++: no tendency to adhere to rolls or other mechanical parts, no blocking problems on winding or during processing on packaging machinery, low production costs
−: tendency to adhere to rolls or other mechanical parts, blocking problems on winding and during processing on packaging machinery, high production costs due to complicated handling of film in machinery

TABLE 4

| Example | Weathering | Modulus of elasticity N/mm² longitudinal | transverse | Tear strength N/mm² longitudinal | transverse | Elongation at break % longitudinal | transverse | Total discoloration value | Surface defects | Gloss side A | side C | Haze |
|---|---|---|---|---|---|---|---|---|---|---|---|---|
| E 1 | Before | 4300 | 5800 | 220 | 280 | 170 | 100 | | | 140 | 170 | 2.5 |
| | After | 4100 | 5480 | 190 | 270 | 150 | 90 | 0.2 | none | 132 | 165 | 2.8 |
| E 2 | Before | 4200 | 5600 | 215 | 260 | 170 | 100 | | | 140 | 170 | 2.5 |
| | After | 4030 | 5400 | 190 | 250 | 150 | 90 | 0.25 | none | 138 | 165 | 2.8 |
| E 3 | Before | 4500 | 5700 | 230 | 280 | 175 | 105 | | | 130 | 170 | 3.0 |
| | After | 4000 | 5350 | 196 | 255 | 150 | 89 | 0.24 | none | 138 | 155 | 3.7 |
| E 4 | Before | 4300 | 5800 | 220 | 275 | 178 | 111 | | | 130 | 170 | 3.0 |
| | After | 3900 | 5360 | 192 | 248 | 148 | 92 | 0.27 | none | 138 | 165 | 3.5 |

What is claimed is:

1. A sealable, UV-resistant, coextruded, biaxially oriented polyester film with one matt side and with at least one base layer B based on a thermoplastic polyester, and with a scalable outer layer A, and with another matt, outer layer C, wherein at least one layer comprises a UV absorber, and wherein the sealable outer layer A has a minimum sealing temperature of about 110° C. and a seal seam strength of at least about 1.3 N/15 mm, and the topographies of the two outer layers A and C have the following features:

sealable outer layer A:
$R_a$<30 nm
value measured for gas flow about 50 to about 4000 s nonsealable, matt outer layer C:
200 nm<$R_a$<1000 nm
value measured for gas flow <50 s.

2. The film as claimed in claim 1, characterized in that the sealable outer layer A comprises an amorphous copolyester which has been built up from ethylene terephthalate units and ethylene isophthalate units and from ethylene glycol units.

3. The film as claimed in claim 2, wherein the the amorphous copolyester of the sealable outer layer A contains from 40 to 95 mol % of ethylene terephthalate and from 60 to 5 mol % of ethylene isophthalate.

4. The film as claimed in claim 2, wherein the amorphous copolyester of the sealable outer layer A contains from about 50 to about 90 mol % of ethylene terephthalate and from about 50 to about 10 mol % of ethylene isophthalate.

5. The film as claimed in claim 2, wherein the amorphous copolyester of the sealable outer layer A contains from about 60 to about 85 mol % of ethylene terephthalate and from about 40 to about 15 mol % of ethylene isophthalate.

6. The film as claimed in claim 1, wherein the concentration of the UV absorber is from about 0.01 to about 5.0% by weight based on the weight of the respective layer of the polyester used.

7. The film as claimed in claim 6, wherein the concentration of the UV absorber is from about 0.1 to about 3% by weight.

8. The film as claimed in claim 1, wherein the UV absorbers are selected from one or more of 2-hydroxybenzophenones, 2-hydroxybenzotriazoles, organonickel compounds, salicylic esters, cinnamic ester derivatives, resorcinol monobenzoates, oxanilides, hydroxybenzoates, sterically hindered amines and triazines.

9. The film as claimed in claim 8, wherein the UV absorber is a 2-hydroxybenzotriazole or a triazine.

10. The film as claimed in claim 8, wherein the UV absorber is 2-(4,6-diphenyl-1,3,5-triazin-2-yl)-5-hexyloxyphenol or 2,2'-methylenebis(6-(2H-benzotriazol-2-yl)-4-(1,1,2,2-tetramethylpropyl, -tetramethylbutyl)phenol.

11. A process for producing a film according to claim 1, wherein the melts corresponding to the individual layers of the film are coextruded through a flat-film die, the resultant film is drawn off for solidification on one or more rolls, the film is then biaxially stretched (oriented), and the biaxially stretched film is heat-set.

12. The process as claimed in claim 11, wherein the film is corona- or flame-treated on the surface layer intended for treatment.

13. The process as claimed in claim 11, wherein a UV absorber is present in the melts.

14. The process as claimed in claim 13, wherein the UV absorber is added by way of masterbatch technology.

15. The process as claimed in claim 14, wherein the masterbatch comprises thermoplastic and from about 2.0 to about 50.0% by weight, of UV absorber, the constituents always giving about 100% by weight in total.

16. The process as claimed in claim 15, wherein the masterbatch comprises thermoplastic and from about 5.0 to about 30.0% by weight, of UV absorber, the constituents always giving about 100% by weight in total.

17. A method of making an interior decoration, a display, a placards, a protective glazing, a shop outfit, a promotional requisite, a laminating medium, an exterior cladding, a protective covering, an illuminated advertising profile, or a blind, which comprises converting a film as claimed in claim 1 into an interior decoration, a display, a placards, a protective glazing, a shop outfit, a promotional requisite, a laminating medium, an exterior cladding, a protective covering, an illuminated advertising profile, or a blind.

18. A polyester film according to claim 1, wherein said UV absorber is present only in said outer layers A and C.

19. A polyester film according to claim 1, wherein said UV absorber is present only in said outer layers A and C, said outer layer thicknesses ranging from 0.3 to 2.5 micron, wherein said polyester film fulfills weathering test specification ISO 4892.

20. The film as claimed in claim 1, said film containing up to 60% by weight of recycle formed from said film, said film exhibiting a Yellowness value of less than 5.

21. A sealable, UV-resistant, coextruded, biaxially oriented polyester film with one matt side and with at least one base layer B based on a thermoplastic polyester, and with a sealable outer layer A, and with another matt, outer layer C, wherein at least one layer comprises a UV absorber, and wherein the sealable outer layer A has a minimum sealing temperature of about 110° C. and a seal seem strength of at least about 1.3 N/15 mm, and the topographies of the two outer layers A and C have the following features:

sealable outer layer A:
$R_a$<30 nm
value measured for gas flow about 500 to about 4000 s
nonsealable, matt outer layer C:
200 nm<$R_a$<1000 nm
value measured for gas flow <50 s.
wherein the matt outer layer C comprises a blend or a mixture made from two components I and II.

22. The film as claimed in claim 21, wherein the matt outer layer further comprises additives in the form of inert inorganic antiblocking agents.

23. A sealable, UV-resistant, coextruded, biaxially oriented polyester film with one matt side and with at least one base layer B based on a thermoplastic polyester, and with a sealable outer layer A, and with another matt, outer layer C wherein at least one layer comprises a UV absorber, and wherein the sealable outer layer A has a minimum sealing temperature of about 110° C. and a seal seem strength of at least about 1.3 N/15 mm, and the topographies of the two outer layers A and C have the following features:

sealable outer layer A:
$R_a$<30 nm
value measured for gas flow about 500 to about 4000 s
nonsealable, matt outer layer C:
200 nm<$R_a$<1000 nm
value measured for gas flow <50 s.
wherein recycle formed from said film is present at a concentration of up to 60% by weight, based on the total weight of the film.

* * * * *